June 24, 1969

R. S. PEARSON 3,452,230

ELECTROMAGNETIC COIL STRUCTURE FOR
DYNAMOELECTRIC MACHINE STATORS
Filed Dec. 15, 1967

INVENTOR.
ROBERT S. PEARSON
BY Edward N. Goebel
HIS ATTORNEY

United States Patent Office 3,452,230
Patented June 24, 1969

1

3,452,230
ELECTROMAGNETIC COIL STRUCTURE FOR DYNAMOELECTRIC MACHINE STATORS
Robert S. Pearson, Erie, Pa., assignor to General Electric Company, a corporation of New York
Filed Dec. 15, 1967, Ser. No. 690,951
Int. Cl. H02k 1/00, 3/00, 19/26
U.S. Cl. 310—180       2 Claims

ABSTRACT OF THE DISCLOSURE

An electromagnetic coil structure in which a plurality of spirally wound, individual wire wafers have the dimensions of windows within them varied in a progressive manner from wafer to wafer so that when the wafers are stacked upon each other the coil fits firmly about a pole piece which has a core portion with a non-rectangular cross section. The structure of the wafers allows the coil to utilize substantially all of the space at the juncture of the pole piece and a yoke of a dynamoelectric machine in which it is mounted, for its windings.

Background of the invention

This invention relates to electromagnetic coil structures, and more particularly, to electromagnetic coil structures used for the stators of dynamoelectric machines.

By way of illustration, this invention is useful for dynamoelectric machines, such as starter-generators, which are used in aircraft applications requiring the machines to be as light as possible for their rated performance. The sizes of the iron members of these machines, such as the frame or yoke and the pole pieces, are limited to the extent possible to decrease the overall weight of these machines.

The pole pieces of dynamoelectric machines of this type often have non-rectangular core portions. The amount of iron adjacent the yoke of the machine is no more than that which is necessary to prevent this iron from being saturated at the maximum excitation of the machine, with the core portion mushrooming into a larger shoe portion for distributing the magnetic field over an area of the rotor which is sufficient for proper operation of the machine. Since the size of these machines must be limited to the extent possible to decrease their weight, it is desirable to wind a maximum number of windings in a given space around the non-rectangular core portions of the poles.

The irregular shape of the core portions has made it extremely difficult, heretofore, to provide anything but a random wound coil for the main excitation windings of these machines. However, random wound coils make very inefficient use of the space in which they are mounted because the individual windings of these coils tend to cross over one another, wasting space within the coils themselves, and bunch up into toroidally shaped structures which waste space at corners formed within the machines where the pole pieces are mounted against the yoke.

It is, therefore, an object of this invention to provide an electromagnetic coil structure in which a coil wound about a pole piece having a core portion with a non-rectangular cross section, has dimensions which can be controlled during winding to utilize for windings substantially all of the area in which the coil is mounted.

2

It is another object of this invention to provide an electromagnetic coil strutcure in which a coil wound about a pole piece having a non-rectangular cross section effectively utilizes the space at the corners formed where the pole piece meets the yoke of a dynamoelectric machine.

It is still another object of this invention to provide an electromagnetic coil structure in which the inside dimensions of a coil conform to the shape of an irregularly shaped pole piece on which the coil is mounted and the outside dimensions of the coil match the curvature of the yoke of a dynamoelectric machine.

Summary of the invention

Briefly stated, and in accordance with one aspect of this invention, an electromagnetic coil structure for a dynamoelectric machine comprises an excitation coil having a plurality of spirally wound, individual wire wafers mounted about an irregularly shaped core portion of a pole piece for the machine. The spirals of adjacent wafers are wound in oppoiste directions and adjacent wafers are interconnected through the inner ends of the spirals of each or the outer ends of the spirals of each to eliminate crisscrossing conductors which add to the dimensions of the coils. Each of the wafers has a window in its center which allows it to be fitted about the core portion, with the dimensions of the windows varying in accordance with the changes in the shape of the core portion so that each wafer fits firmly about the core, including the space at the juncture of the pole pieces and the yoke of the machine. Due to the spiral nature of the individual wafers, the exterior dimensions of the coil conform to the shape of the yoke, further utilizing the space around the pole pieces for the windings of the coil.

Brief description of the drawings

The novel features believed characteristic of this invention are set forth with particularity in the appended claims. The invention itself, however, together with further objects and advantgaes thereof, may best be understood by referring to the following description taken in conjunction with the accompanying drawings in which:

Description of a preferred embodiment

Figure 1:
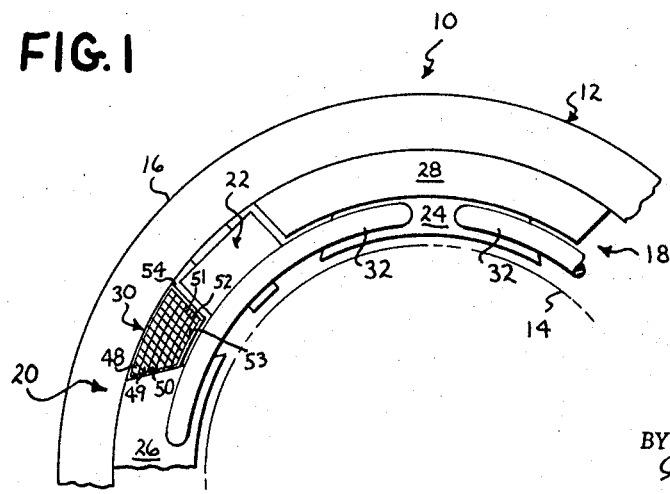
FIG. 1 shows a portion of the stator of a dynamoelectric machine which includes coil structures made in accordance with this invention.

Referring now more specifically to the drawings, FIG. 1 shows a partial schematic diagram of a dynamoelectric machine 10 which includes a stator 12 and a rotor 14. The stator 12 comprises a motor frame or yoke 16 on which are mounted a plurality of electromagnetic coil structures, each of which includes a pole piece having a motor coil wound thereabout.

The electromagnetic coil structures include main pole structures 18 and 20, having a commutating pole structure 22 mounted therebetween. The main pole structures 18 and 20 comprise pole pieces 24 and 26 which have motor coils 28 and 30, respectively, wound about their core portions. Shoe portions of these pole pieces are adjacent the rotor 14 and extend over an area of the rotor which allows the rotor to be adequately excited for the required performance of the machine. Compensating windings 32 for the machine extend between and pass through the shoe portions of the main pole pieces 24 and 26.

The dynamoelectric machine 10 is of the type described above, designed to be as compact as possible for aircraft applications. The pole pieces 24 and 26 have a non-rectangular cross section which is intended to contain no more iron than is necessary for the proper performance of the machine. It can be seen from FIG. 1 that the placement of the commutating pole structure 22 between the main pole structures 18 and 20 and the mounting of the compensating windings in the pole pieces 24 and 26 leaves little extra room for the main coil windings beyond that required for the copper of the windings themselves and a path for cooling air.

Commonly, prior to assembling the whole machine of the type referred to, the pole pieces are mounted in a circle and are held in position by the compensating windings of the machine. This circular structure is then inserted through one side of the yoke to aid in assembling a compact structure of this type within a cylindrical yoke. It is imperative that the coils mounted on the main poles, such as coils 28 and 30, are compact and retain the shape to which they are set to facilitate this assembling.

In accordance with this invention, I provide a main pole structure having an excitation coil which has its internal and external dimensions accurately controlled to utilize substantially all of the space at the juncture of the yoke 16 and the pole piece 26 for its windings, in spite of the non-rectangular shape of the core of the pole piece 26, and to utilize all of the space adjacent the interior surface of the yoke 16 for the windings.

The main coils 28 and 30 comprise a plurality of spirally wound wafers 34, 36, 38, and 40 of one layer of insulated round wire, each of these wafers having a window in its center which is in the shape of the core about which it is to be wound. These wafers are shown in the expanded view of a main excitation coil of FIG. 2. It can be seen from the drawings that the spirals of adjacent wafers are wound in the opposite directions, with wafers 34 and 38 wound in a clockwise direction and wafers 36 and 40 wound in a counter-clockwise direction. Adjacent wafers of the coil are interconnected either through the inner ends of both of their spirals or through the outer ends of their spirals so that current flows in the same direction in each of the wafers. This interconnection of the wafers eliminates crisscrossing conductors within the coil which tend to waste space by expanding the dimensions of the coil.

For example, the wafer 38 is interconnected with the wafer 36 through conductors 42 and 44 which are joined together by an appropriate method, such as welding. The wafer 38 is interconnected with the wafer 40 by means of a conductor 46 which, in the preferred embodiment, is a continuous strand of the round insulated wire that makes up these wafers. As an alternative, these wafers 38 and 40 could be independently wound, having their internal ends joined in the same manner as conductors 42 and 44.

The type of structure just described has heretofore been used for the construction of excitation coils which use large wire having rectangular cross section, this wire having a width of about ⅜ of an inch for example, on normal rectangularly shaped cores, because this winding structure eliminates the need for a large number of bends in cumbersome wire of this type.

Figure 2:
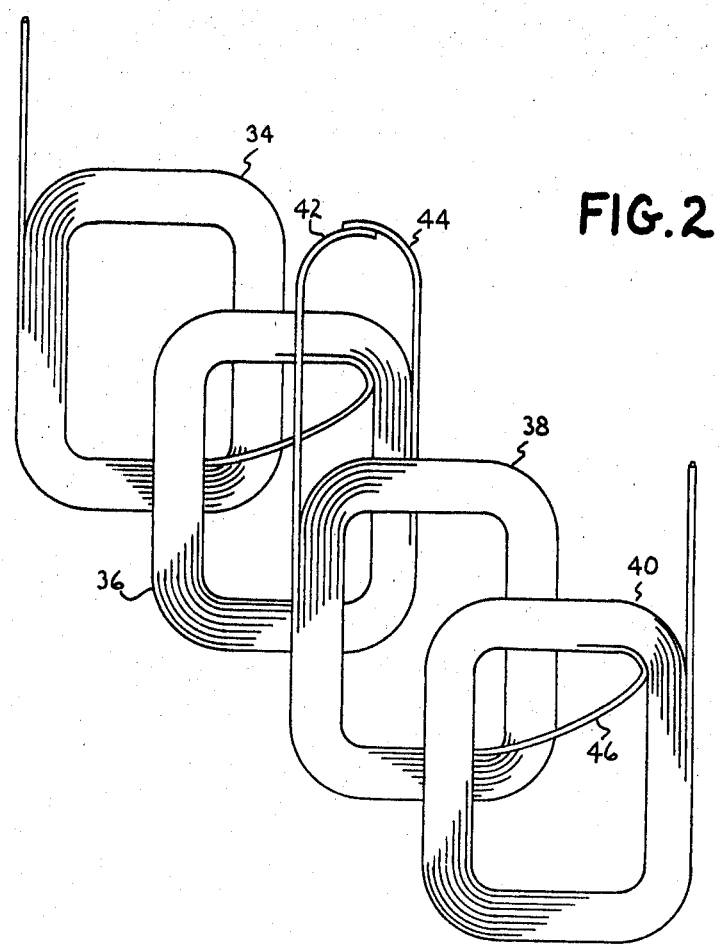
FIG. 2 shows a view of an expanded coil made from a plurality of wound wafers in accordance with this invention.

Referring to both FIGS. 1 and 2, the dimensions of the windows of the individual wafers vary from wafer to wafer to allow each wafer to fit firmly about that portion of the core upon which it is mounted. Since the core of the tapered main pole 26 is smallest where it joins the yoke 16, the window of a wafer 48 is the smallest of the windows in the wafers 48–53 which make up the coil 30. The wafer 53 has the largest window. The dimensions of the windows of the individually wound wafers can be accurately controlled by winding the wafers about a form (or forms) having a center section which is adjusted to match the varying dimensions of the tapered core. The number of windings per wafer decreases progressively from wafer 48 to wafer 53 to allow as complete a use of the space for the windings as possible, while still leaving some room for the flow of cooling air around the main pole structure. Since the wafers are individually wound and the dimensions of their windows are varied, the coil structure can be bent so that the exterior dimensions of the coil approximate the curve of the yoke 16. For this reason, the windings of the coil 30 fit into the acute angle formed at the juncture of the pole piece 26 and the yoke 16, effectively utilizing substantially all of the space around the pole piece 26 and along the internal surface of the yoke 16 for the windings themselves. A ground insulation system 54 prevents the windings from contacting other portions of the machine during construction and thereafter.

On a particular machine of the type described throughout this application, there was difficulty in assembling a machine due to the size of main coil structures in which 55 turns of 0.032 inch diameter wire were random wound about cores having non-rectangular cross sections. When the coil structure of this invention was used, the machine was assembled much more easily in spite of the fact that the diameter of the wire was increased to 0.0359 inches and the number of turns was increased to 56 to increase the excitation of the machine. Except for these changes, the structure of the two machines was substantially the same. Furthermore, better paths were obtained for the flow of cooling air. Since there was more contact between adjacent wire of the new coils than there had been with the random wound coils, better heat transfer was obtained and hot spots within the coils were reduced.

This invention is not limited to the particular details of the illustrated preferred embodiment. It is intended that the appended claims cover variations, modifications and applications of this invention which do not depart from its true spirit and scope.

What I claim as new and desire to secure by Letters Patent of the United States is as follows:

1. In a dynamoelectric machine including a rotor and a yoke, a plurality of electromagnetic coil structures each of which comprises a pole piece having a shoe portion and a core portion and having an excitation coil mounted about said core portion; means for mounting said core portion of each of said pole pieces against the inside surface of the yoke so that said shoe portion is adjacent the rotor; said core portion of each of said pole pieces changing in width in its extension between said yoke and said shoe portion; each of said excitation coils comprising a plurality of spirally wound wafers of insulated round wire, each of said wafers having a window in the center thereof in the shape of said core portion with the dimensions of the windows varying in accordance with the changes in the width of said core portion so that each wafer fits firmly about said core portion; and adjacent wafers having spirals wound in opposite directions with said adjacent wafers interconnected either through the inner ends of the spirals of both or through the outer ends of the spirals of both to allow the current to flow in the same direction in each of said adjacent wafers.

2. For use in a dynamoelectric machine including a rotor, a cylindrical yoke, a plurality of electromagnetic coil structures, and compensating windings, of the type in which the dynamoelectric machine is assembled by inserting into one end of the yoke a structure comprising the coil structures held in a cylindrical configuration by the compensating windings; at least one coil structure comprising a pole piece having a shoe portion and a core portion and having an excitation coil mounted about said core portion; means for mounting said core portion against the inside surface of the yoke so that said shoe portion is adjacent the rotor; said core portion changing in width in its extension between said yoke and said shoe portion; said excitation coil comprising a plurality of spirally wound wafers of insulated round wire, each of said wafers having a window in the center thereof in the shape of said core portion with the dimensions of the windows varying in accordance with the changes in the width of said core portion so that each wafer fits firmly about said core portion; and adjacent wafers having spirals wound in opposite directions with said adjacent wafers interconnected either through the inner ends of the spirals of both or through the outer ends of the spirals of both to allow the current to flow in the same direction in each of said adjacent wafers.

References Cited

UNITED STATES PATENTS

| 287,611 | 10/1883 | Bain | 310—195 |
|---|---|---|---|
| 2,130,843 | 9/1938 | Hill et al. | 310—194 |
| 3,340,414 | 9/1967 | Woodman | 310—194 |

WARREN E. RAY, *Primary Examiner.*

U.S. Cl. X.R.

310—186, 193, 208